United States Patent
Manor et al.

(10) Patent No.: US 8,909,818 B2
(45) Date of Patent: Dec. 9, 2014

(54) METHOD FOR SHORTENING ENUMERATION OF TIGHTLY COUPLED USB DEVICE

(71) Applicants: Liron Manor, Haifa (IL); Yoram Rimoni, Haifa (IL); Sergio Kolor, Haifa (IL)

(72) Inventors: Liron Manor, Haifa (IL); Yoram Rimoni, Haifa (IL); Sergio Kolor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/629,486

(22) Filed: Sep. 27, 2012

(65) Prior Publication Data

US 2014/0089532 A1 Mar. 27, 2014

(51) Int. Cl.
*G06F 3/06* (2006.01)
*G06F 13/00* (2006.01)

(52) U.S. Cl.
USPC ............. 710/8; 710/2; 710/5; 710/11; 710/15

(58) Field of Classification Search
None
See application file for complete search history.

(56) References Cited

U.S. PATENT DOCUMENTS

| | | | |
|---|---|---|---|
| 6,795,872 B2 | 9/2004 | Page et al. | |
| 7,752,029 B2 | 7/2010 | Tamayo et al. | |
| 8,046,508 B2 | 10/2011 | Leaming | |
| 8,161,220 B2 | 4/2012 | Ulenas | |
| 2010/0180051 A1 | 7/2010 | Harris | |
| 2012/0303846 A1* | 11/2012 | Li | 710/63 |

* cited by examiner

*Primary Examiner* — Scott Sun
(74) *Attorney, Agent, or Firm* — Howard Seo

(57) ABSTRACT

In a Universal Serial Bus (USB) enumeration procedure, a USB Host questions a USB Device for its capabilities and chooses a set of capabilities that best fit. When the USB Device is enumerated, the USB Host may perform several time-consuming and power-consuming operations. However, when the USB Device is tightly or permanently coupled to the USB Host, part of the enumeration procedure may be redundant and can be eliminated. Accordingly, a method, an apparatus, and a computer program product for shortening enumeration of the USB Device tightly coupled to the USB Host are provided. The USB Host sends a request for a Device descriptor to the USB Device, receives a plurality of descriptors in a single transfer from the USB Device, and sets a configuration of the USB Device based on the received plurality of descriptors.

20 Claims, 15 Drawing Sheets

METHOD FOR SHORTENING ENUMERATION OF TIGHTLY COUPLED USB DEVICE

BACKGROUND

1. Field

The present disclosure relates generally to Universal Serial Bus (USB) devices, and more particularly, to shortening enumeration of a tightly coupled USB device.

2. Background

The Universal Serial Bus (USB) is a standard peripheral interface for attaching computers (e.g., smartphones, tablets, ultrabooks, and laptops) to a wide variety of peripheral devices. These peripherals are generally referred to as functions, which may include hubs and devices, such as, keyboards, mice, cameras, monitors, modems, storage, and many other peripherals.

Devices in a USB system connect to a USB Host in a tiered star topology wherein each device connects to the USB Host through one or more hubs. The USB system may be a polled bus wherein a USB Host computer includes a single USB controller that manages all communication on the bus and monitors the bus topology for changes due to devices being attached or removed.

Bus transactions may include three packets. The USB Host controller sends a token packet describing the type and direction of the transaction, a device address, and an endpoint number. The USB device that is addressed recognizes its address from the token packet. Data is transferred either from the USB Host to the addressed device or from the addressed device to the USB Host based on the direction specified in the token packet. The destination of the data may respond with a handshake packet indicating a receipt status for the transferred data. Token usage may differ dependent on a type of USB system implemented. For example, in USB3.0 (Super Speed), a token packet may be used differently than in USB2.0 (High Speed).

While the USB system supports multiple peripherals connected to the bus, the USB protocol is a point-to-point protocol. In other words, a single USB Host can send data to a single uniquely addressed device at a time. Thus, data for the various devices are time multiplexed so that each device can receive or transmit data during its time slot.

The USB system generally defines frames that are one millisecond long. Within that frame, the USB system may allocate different time slots to many or all of the devices on the bus. Each device has a unique address. Thus, the device knows whether transmitted data is intended for the device. The device may also supply the unique address when transmitting data to allow the USB Host to know from which device the data is received.

When a USB device is first connected to the USB Host, the USB device performs an initialization, enumeration, and configuration process to set up the USB device for use by the USB Host. This setup process may be quite lengthy for complex USB devices. However, many operating systems impose certification requirements on how long a USB device can take to perform the setup process before it is available to the operating system.

Thus, there is a need for systems, apparatuses, and methods for performing a fast setup process to meet operating system requirements while still allowing complex configuration of USB devices.

SUMMARY

In a Universal Serial Bus (USB) enumeration procedure, a USB Host questions a USB Device for its capabilities and chooses a set of capabilities that best fit. The USB Host also sets a USB Device bus address. When the USB Device is enumerated, the USB Host may perform several time-consuming and power-consuming operations. However, when the USB Device is tightly or permanently coupled to the USB Host, part of the enumeration procedure may be redundant and can be eliminated. Accordingly, a method, an apparatus, and a computer program product for shortening enumeration of the USB Device tightly coupled to the USB Host are provided.

In an aspect of the disclosure, the USB Host sends a request for a Device descriptor to the USB Device, receives a plurality of descriptors in a single transfer from the USB Device, and sets a configuration of the USB Device based on the received plurality of descriptors. The USB Host also sets a USB Device bus address to a known value.

In another aspect of the disclosure, the USB Host sends a request for a Device descriptor to the USB Device, receives a plurality of descriptors in a single transfer from the USB Device, determines that an error condition occurs, sends a second request for the Device descriptor to the USB Device based on the error condition, receives the Device descriptor from the USB Device in response to the second request, sets a bus address for the USB Device, sends a third request for the Device descriptor to the USB Device, receives the Device descriptor from the USB Device in response to the third request, sends at least one other request for at least one additional descriptor to the USB Device, the at least one additional descriptor different from the Device descriptor, receives the at least one additional descriptor from the USB Device in response to the at least one other request, wherein the sending of the at least one other request for the at least one additional descriptor and the receiving of the at least one additional descriptor are repeated according to a number of additional descriptors the USB Device has to present to the USB Host, and sets a configuration of the USB Device based on all descriptors received from the USB Device.

In a further aspect of the disclosure, the USB Host sets a configuration of the USB Device based on information previously known to the USB Host and the USB Device.

In an aspect of the disclosure, the USB Device receives a request for a Device descriptor from the USB Host, sends a plurality of descriptors in a single transfer to the USB Host, and receives a set configuration from the USB Host based on the plurality of descriptors sent to the USB Host.

In another aspect of the disclosure, the USB Device receives a request for a Device descriptor from the USB Host, sends a plurality of descriptors in a single transfer to the USB Host, receives a second request for the Device descriptor from the USB Host based on an error condition, sends the Device descriptor to the USB Host in response to the second request, receives a set bus address from the USB Host, receives a third request for the Device descriptor from the USB Host, sends the Device descriptor to the USB Host in response to the third request, receives at least one other request for at least one additional descriptor from the USB Host, the at least one additional descriptor different from the Device descriptor, sends the at least one additional descriptor to the USB Host in response to the at least one other request, wherein the receiving of the at least one other request for the at least one additional descriptor and the sending of the at least one additional descriptor are repeated according to a number of additional descriptors the USB Device has to present to the USB Host, and receives a set configuration from the USB Host based on all descriptors sent to the USB Host.

DETAILED DESCRIPTION

Figure 1:
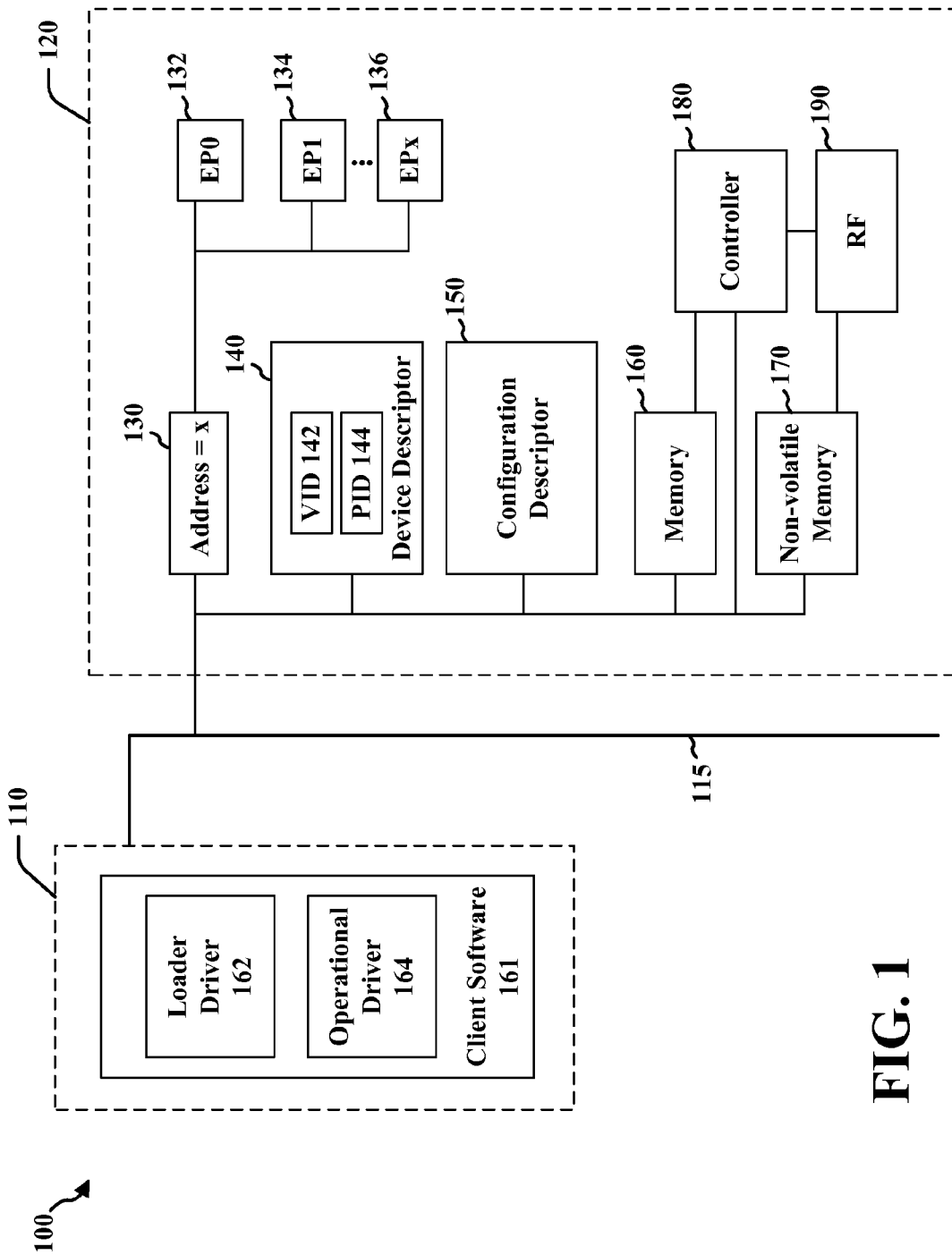
FIG. 1 is a block diagram illustrating an example of a USB Device coupled to a USB Host.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of USB systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a block diagram 100 illustrating an example of a USB Device coupled to a USB Host. Referring to FIG. 1, a USB Host 110 is shown connected to a USB Device 120 through a USB bus 115. In an aspect, many USB Devices 120 may be connected to the USB Host 110 at various levels. The USB Device 120 may include an address register 130 and an endpoint zero (EP0) 132 (also referred to as a default control endpoint 132). The USB Device 120 may also include other endpoints, such as endpoint 1 (EP1) 134 through endpoint n (EPx) 136. In total, a USB system may have 32 endpoints, 16 for the OUT direction and 16 for the IN direction. The endpoints may be defined as EPx, where x is between 0 and 15.

An endpoint is a uniquely identifiable portion of the USB Device 120. Each USB Device 120 includes a collection of independent endpoints. Each USB Device 120 includes a unique address contained in the address register 130. The unique address is assigned by the USB Host 110 which assigns an address for each USB Device it detects as part of an enumeration procedure. Each endpoint within a USB Device 120 is given a specific address. Furthermore, each endpoint is unidirectional with a data flow direction toward the USB Host 110 or a data flow direction toward the endpoint. Thus, the USB Host 110 recognizes a given endpoint as a combination of the Device address, the endpoint address, and the flow direction. The default control endpoint 132 supporting control transfers is assigned the endpoint address zero (EP0) and is present in each USB Device 120.

All USB Devices 120 includes a default control endpoint 132 for both input and output. USB system software uses the default control endpoint 132 to initialize, enumerate, and configure the USB Device 120. For example, a controller 180 may cooperate with the USB Host 110 in performing the initialization, enumeration, and configuration process. In addition, the controller 180 may perform many other functions in an operational mode to perform the tasks for which the USB Device 120 is designed. As a non-limiting example, the USB Device 120 may be configured as a wide area network (WAN) device and include an RF module 190 with an antenna for communication via a wireless signal.

The USB Device 120 may include memory 160. As non-limiting examples, the memory 160 may include software for execution by the controller 180, information related to enumeration and configuration, and information related to operational modes of the USB Device 120.

The USB Device 120 may also include non-volatile memory 170, such as, for example, Flash memory and Electrically Erasable Programmable (EEPROM) memory. As non-limiting examples, the non-volatile memory 170 may include software for execution by the controller, information related to enumeration and configuration, and information related to operational modes of the USB Device 120.

The USB Device 120 may include data structures, such as a Device descriptor 140 and a configuration descriptor 150. Various other descriptors may also be included in the USB Device 120. The Device descriptor 140 may include a vendor identifier (VID) 142 and a product identifier (PID) 144. For the Device descriptor 140, the vendor identifier and product identifier form a unique combination for the USB Host 110 to query in order to determine what type of device is connected to the USB bus 115. The configuration descriptor 150 may include information for the USB Host 110 to query for determining what type of configuration is required for the device connected to the USB bus 115.

In FIG. 1, the Device descriptor 140 and the configuration descriptor 150 are shown as separate blocks. However, those of ordinary skill in the art will recognize that the descriptors may be implemented in many different forms. As non-limiting examples, the Device descriptor 140 and the configuration descriptor 150 may be embodied as configurable switches within the USB Device 120, as values stored in the non-volatile memory 170, or as values stored in non-volatile memory within the controller 180.

Operating systems may require devices to power up quickly. For example, for Windows Vista® all devices must perform system resume operations from an Advanced Configuration and Power Interface (ACPI) S3 state in two seconds or less. For complex USB Devices 120, this requirement may be difficult to meet.

In an aspect, a tightly coupled Universal Serial Bus (USB) Device and USB Host may be enabled to significantly shorten a USB enumeration process. In the description below, the tightly coupled USB Device and USB Host may be connected at all times (e.g., hard-wired).

In more detail, the USB enumeration process is a procedure in which a USB Host 110 questions a Device 120 for its capabilities and chooses the set of capabilities that best fit. The disclosure involves several methods that help significantly shorten the enumeration process when the Device 120 is tightly or permanently connected to the USB Host 110, such as the case for High Speed Inter-Chip (HSIC) or Super Speed Inter-Chip (SSIC). Notably, SSIC may be equivalent to Super Speed USB (SSUSB). When the USB Device 120 (e.g., tethered modem) is enumerated, the USB Host 110 may perform several time-consuming (and hence power-consuming) operations such as: 1) Address assignment; 2) Obtaining Device capabilities; and 3) Choosing Device capabilities from the obtained capabilities, and setting the chosen capabilities.

The above procedure may be generic and useful for a general purpose case. However, when the Device 120 is tightly or permanently coupled to a certain USB Host controller, part of the procedure may be redundant and can be eliminated. This may be the case for HSIC (or SSIC, SSUSB), where a Device 120 is physically connected to an HSIC (or SSIC, SSUSB) Host Core, or when the Device is constantly connected to a certain High Speed USB (HSUSB) Core.

Figure 2:
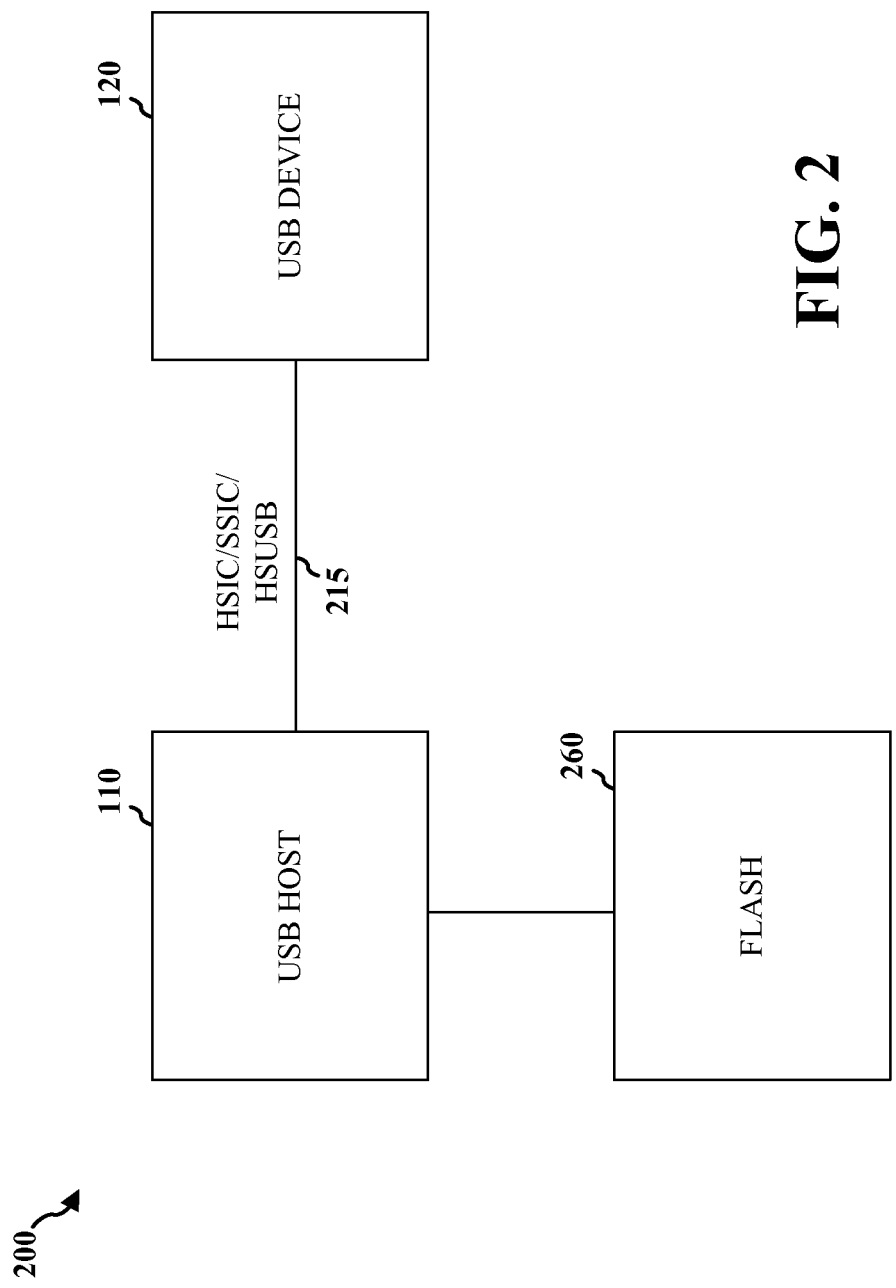
FIG. 2 is a diagram illustrating a USB Device connected to a USB Host controller over permanent connection.

FIG. 2 is a diagram 200 illustrating a USB Device 120 (e.g., USB modem) connected to a USB Host 110 controller (e.g., application processor) over a HSIC, SSIC, or HSUSB permanent connection 215. The USB Host 110 may be connected to a memory device 260, such as a Flash memory. In the case of HSIC (or SSIC, SSUSB), during each enumeration process, the USB Host 110 will question the Device 120 for the same information and will assign the same address to the Device 120 even though no other device may be connected to an HSIC (or SSIC, SSUSB) bus other than the Device 120.

The enumeration may be performed when at least one of the following scenarios occurs: 1) Power up or cold reset; 2) Warm reset; 3) USB power collapse on either USB Host or Device; and 4) USB Host or Device power collapse. Scenarios 1-3 affect boot time, while scenario 4 prevents certain use cases from using a power collapse, due to a lengthy period of time it would take to restore normal operation. Hence, both boot time and battery power is affected by the lengthy enumeration process. The enumeration may also be performed upon the occurrence of a ROM boot loader (for loading a secondary boot loader), a secondary boot loader (for loading a Device image), or an operating system start-up (for Device connectivity).

Figure 3:
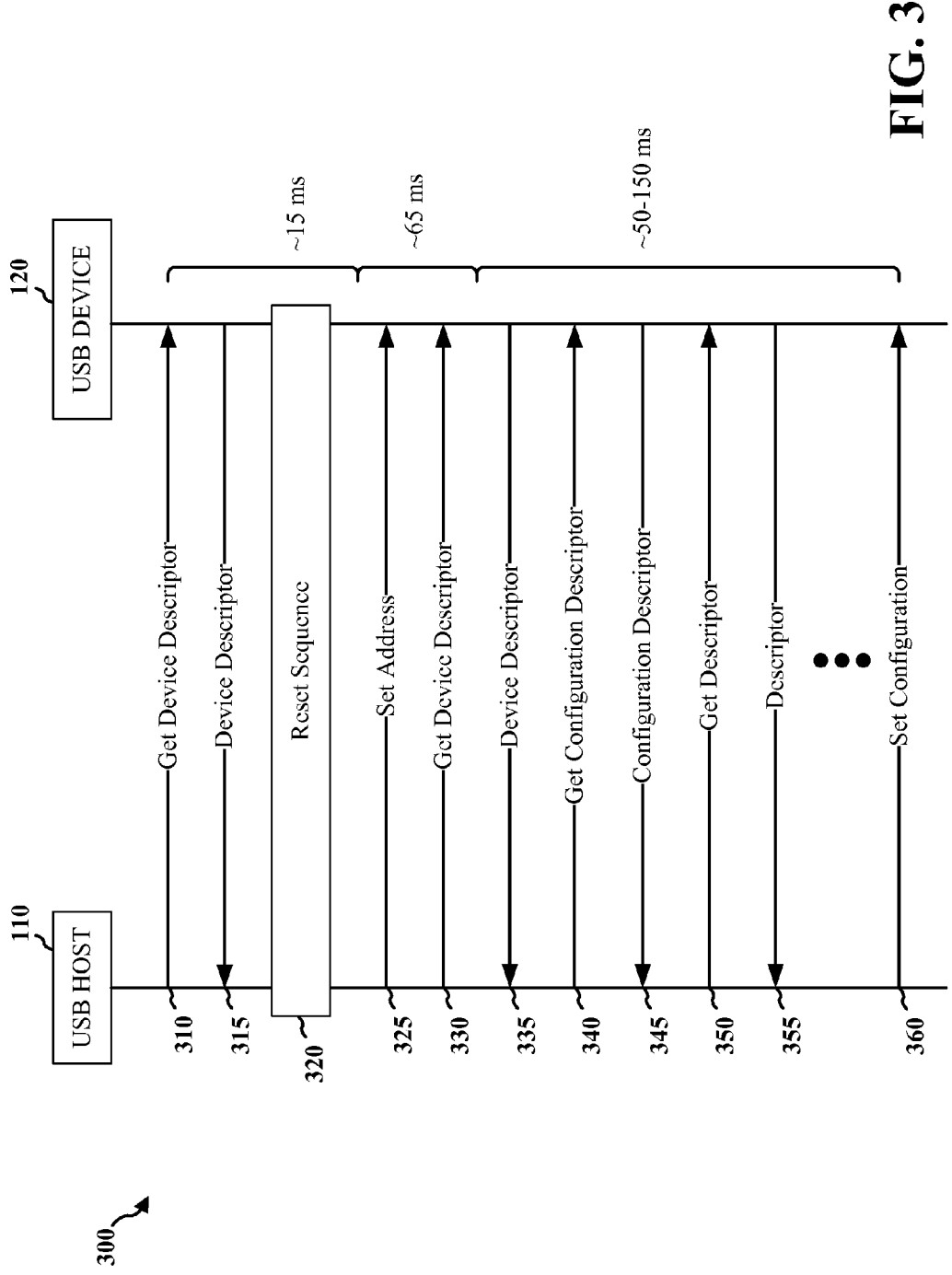
FIG. 3 is a message sequence diagram illustrating a standard enumeration process.

FIG. 3 is a message sequence diagram 300 illustrating a standard enumeration process. The standard enumeration process may take anywhere from 130 to 230 ms to perform. Referring to FIG. 3, at step 310, the USB Host 110 asks the Device 120 for a Device Descriptor. At step 315, the Device 120 returns the Device Descriptor. At step 320, the USB Host 110 resets the USB bus. Notably, the steps 310 to 320 in FIG. 3 may take approximately 15 ms to perform.

At step 325, the USB Host 110 sets the bus address for the Device 120. At step 330, the USB Host 110 again asks the Device 120 for a Device Descriptor. Here, the steps 325 and 330 may take approximately 65 ms to perform.

At step 335, the Device 120 again returns the Device Descriptor. Thereafter, at step 340, the USB Host 110 asks for a Configuration Descriptor. At step 345, the Device 120 returns the Configuration Descriptor. At step 350, the USB Host 110 asks for additional descriptors (e.g., string descriptors). At step 355, the Device 120 returns the requested descriptors. Notably, several iterations of steps 350 and 355 may be performed depending on the number of descriptors available/to be provided. Finally, at step 360, the USB Host 110 sets the configuration of the Device 120 based on the descriptors, completing the enumeration procedure. The steps 335 to 355 in FIG. 3 may take approximately 50 to 150 ms to perform. By summing the amount of time needed to perform the steps 310 to 355 in FIG. 3, a total time needed for the entire standard enumeration process may be determined to be approximately 130 to 230 ms.

Figure 4:
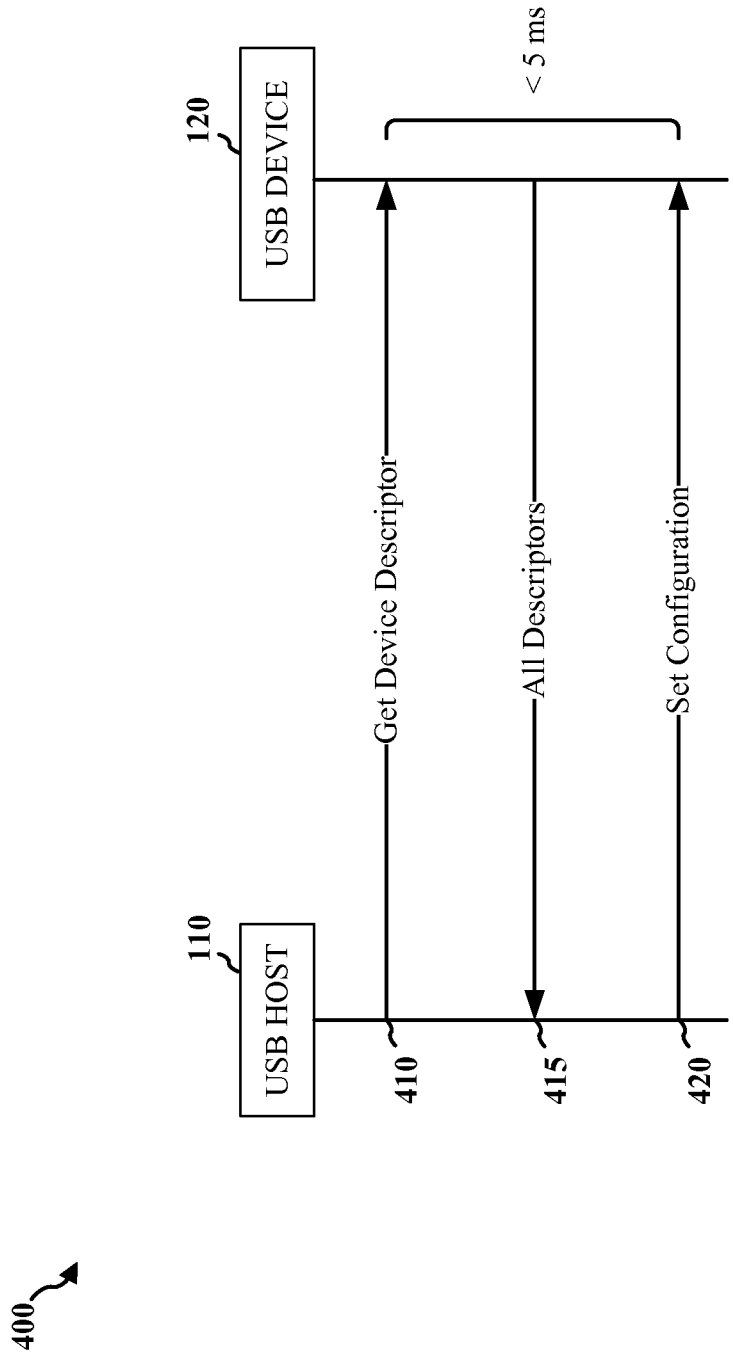
FIG. 4 is a message sequence diagram illustrating a method for shortening an enumeration of a USB Device tightly coupled to a USB Host.

FIG. 4 is a message sequence diagram 400 illustrating a method for shortening an enumeration of a USB Device 120 tightly coupled to a USB Host 110. In FIG. 4, the USB Host 110 performs a minimum number of operations to enumerate the USB Device 120. The USB Host 110 and Device 120 may be in a one-to-one configuration (i.e., one USB Host and one Device). Moreover, a connection between the USB Host 110 and Device 120 may be a static link (e.g., the USB Host and Device are soldered together).

Referring to FIG. 4, at step 410, the USB Host 110 asks the Device 120 for a Device Descriptor. At step 415, the Device 120 returns not only the Device Descriptor (as in FIG. 3), but an entire set of descriptors the Device 120 has to present to the USB Host 110. At step 420, after receiving the entire set of descriptors, the USB Host 110 sets the proper configuration for the Device 120, thus completing the enumeration procedure. The steps 410 to 420 in FIG. 4 may take less than 5 ms to perform (e.g., 2 ms).

In an aspect, the Device 120 may be informed prior to the enumeration procedure, of what address to use (e.g., Device 120 uses address number 1). Therefore, the USB Host 110 may be able to skip an address assignment operation. A reset operation may also be skipped because both the Device 120 and USB Host 110 operate in a High Speed mode (or Super Speed mode). Thus, the reset operation is not needed for an operation such as bus synchronization since the USB Host 110 and Device 120 of FIG. 4 are in a one-to-one bus configuration, and will therefore previously know a bus speed connecting them. All the descriptors the Device 120 has to present to the USB Host 110 may be lumped together to allow for an efficient single transfer of all the descriptors to the USB Host 110.

In a further aspect, it may be desirable to reduce a transfer size at step 415. Accordingly, at step 410, the USB Host 110 may send a pre-defined configuration or composition number to the Device 120. If the composition or configuration did not change from a previous configuration or composition number, which may apply often, the Device 120 does not need to transfer the entire set of descriptors at step 415. Rather, at step 415, the Device 120 may send to the USB Host 110 only a minimum number of descriptors necessary based on the pre-defined configuration or composition number. As such, full flexibility for Device configuration and re-configuration is supported.

Figure 5:
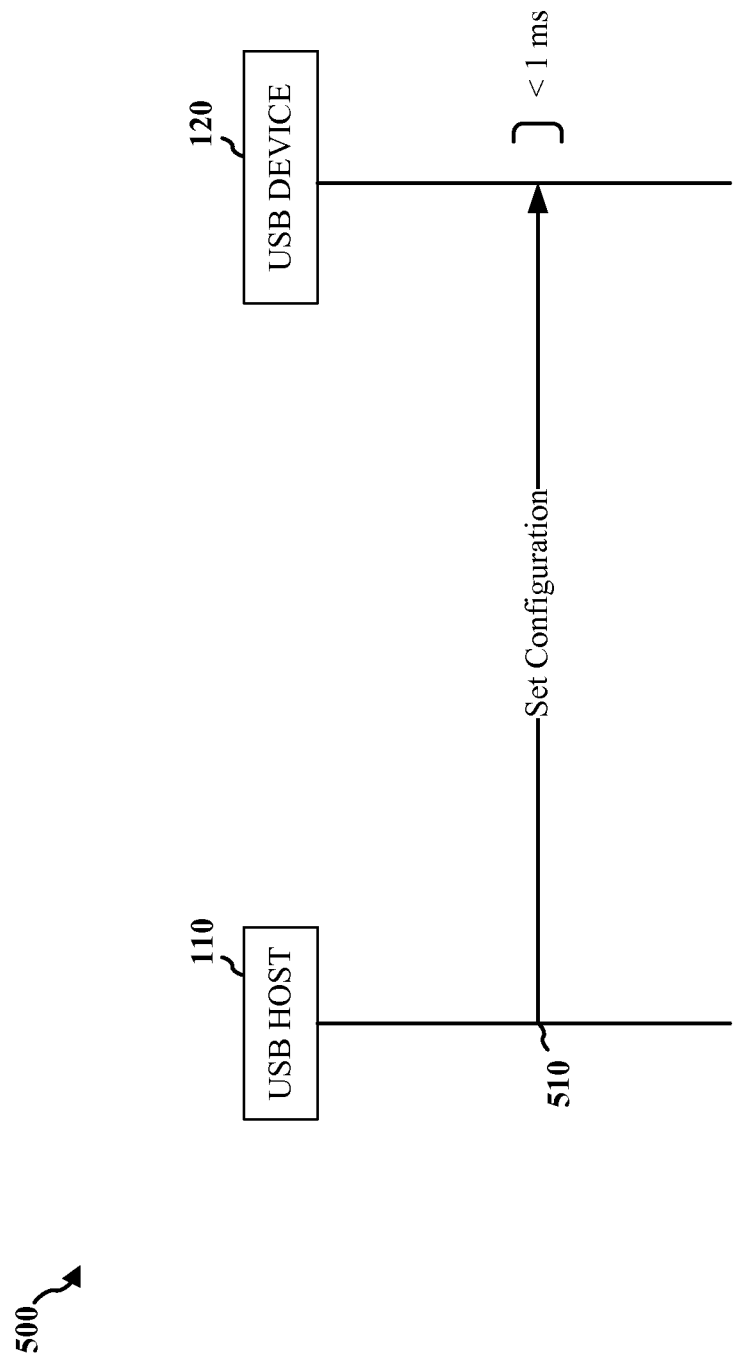
FIG. 5 is a message sequence diagram illustrating further optimization of an enumeration procedure.

FIG. 5 is a message sequence diagram 500 illustrating further optimization of an enumeration procedure. Referring to FIG. 5, the USB Host 110 and Device 120 may only require a single configuration. Accordingly, at step 510, the USB Host 110 may set the configuration of the Device 120 based on information previously known to the USB Host 110 and Device 120. Upon the USB Host 110 setting the configuration, the enumeration procedure is complete and may take less than 1 ms to perform.

Notably, not only do the USB Host 110 and Device 120 skip address assignment and reset sequence operations, but they also skip an exchange of Device descriptors. The optimization method of FIG. 5 trades-off flexibility for supporting multiple configurations and compositions in order to maximize enumeration speed.

Figure 6:
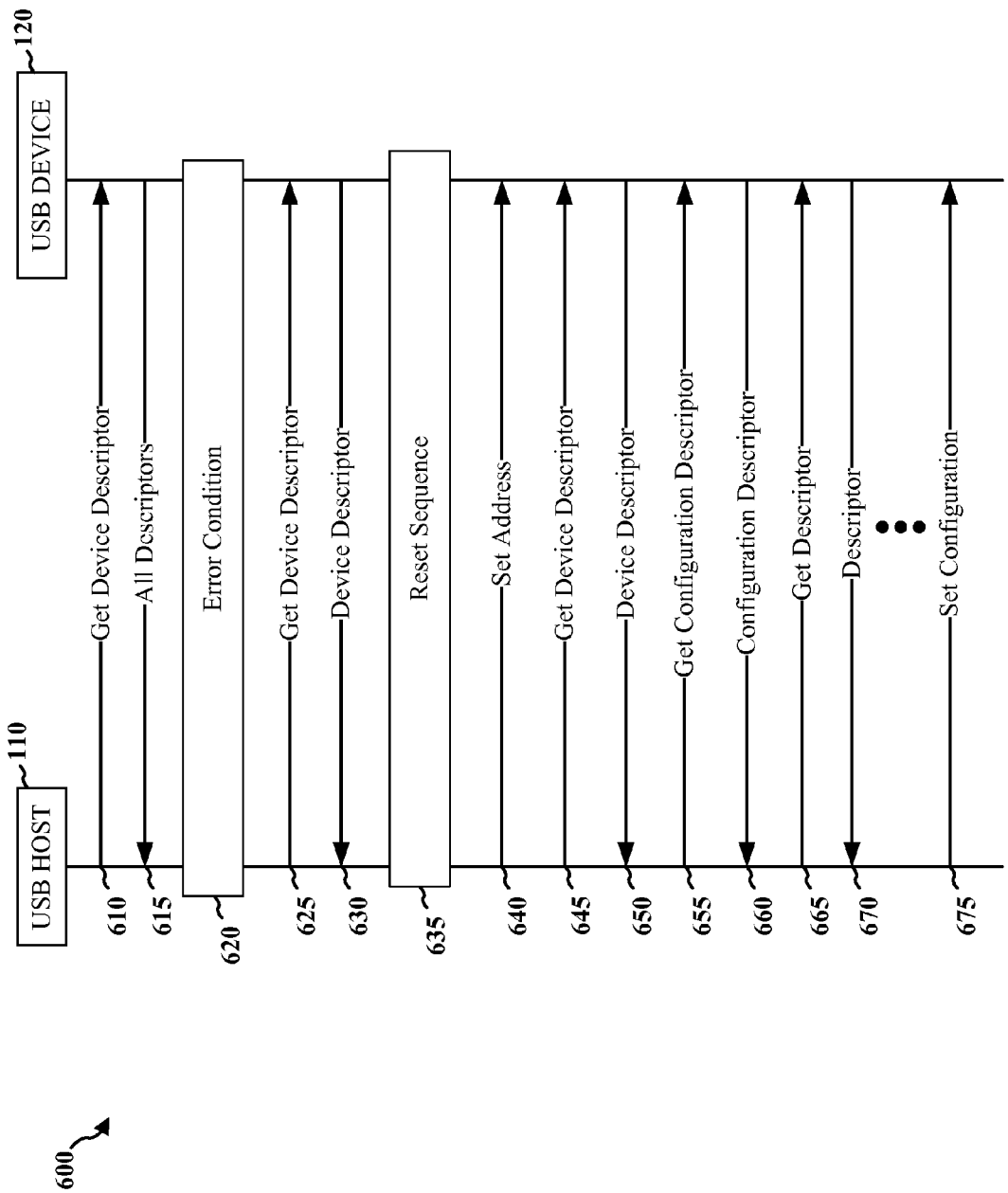
FIG. 6 is a message sequence diagram illustrating a fallback of the method for shortening the enumeration of the USB Device tightly coupled to the USB Host.

FIG. 6 is a message sequence diagram 600 illustrating a fallback of the method for shortening the enumeration of the USB Device 120 tightly coupled to the USB Host 110. The fallback is added to improve robustness of the method of FIG. 4. In FIG. 6, if the Device 120 receives two consecutive Get Device Descriptor signals, the method returns to normal enumeration.

For example, referring to FIG. 6, at step 610, the USB Host 110 asks the Device 120 for a Device Descriptor. At step 615, the Device 120 returns not only the Device Descriptor, but an entire set of descriptors the Device 120 has to present to the USB Host 110. At step 620, the USB Host 110 encounters an error condition. Accordingly, at step 625, the USB Host 110 again asks the Device 120 for a Device Descriptor. Upon receiving the second request for the Device Descriptor, the Device 120 determines that an error has occurred, and returns only the Device Descriptor to the USB Host 110 at step 630. Thereafter, at steps 635 through 675, the standard enumeration procedure as described with respect to FIG. 3 is performed.

In view of the aspects described above, certain advantages may be realized. These include: 1) Significant battery power savings for scenarios such as idle web browsing, where the modem (Device) may be power-collapsed most of the time; 2) Shorter boot time; 3) No significant hardware modifications required; 4) No compromise in flexibility regarding Device multi-configuration or multi-composition support; and 4) Upon failure, fallback to standard enumeration.

Figure 7:
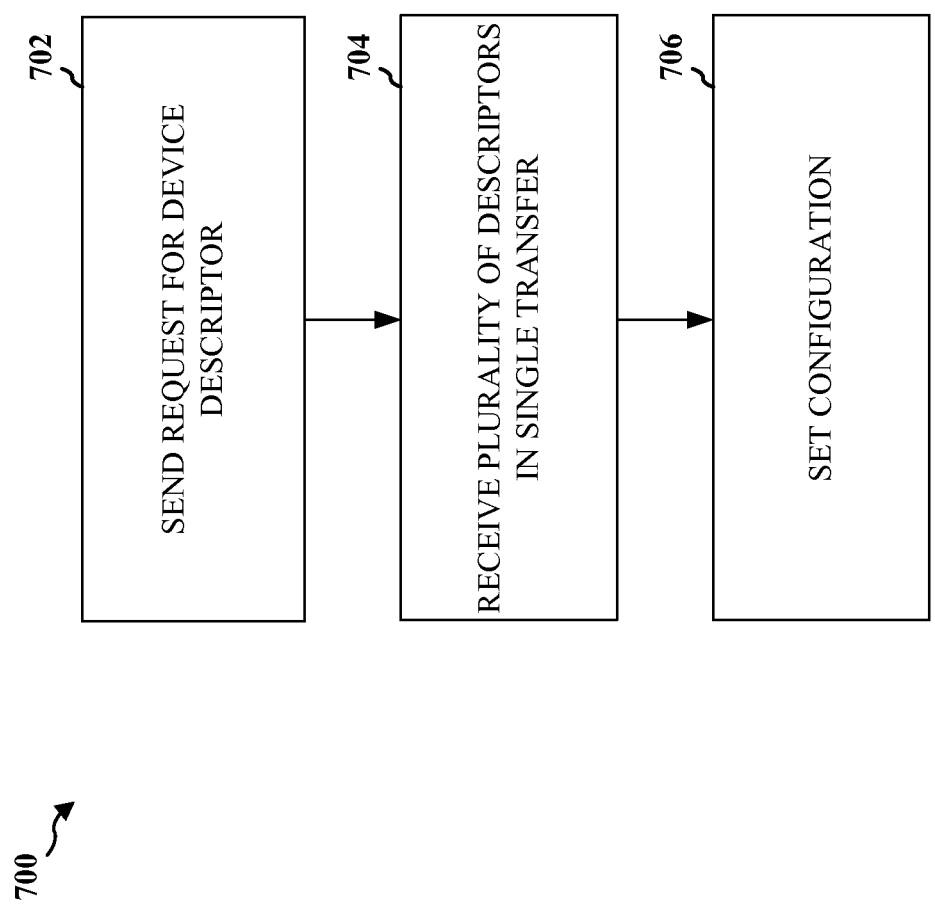
FIG. 7 is a flow chart of a method for shortening enumeration of a Universal Serial Bus (USB) Device coupled to a USB Host.

FIG. 7 is a flow chart 700 of a method for shortening enumeration of a Universal Serial Bus (USB) Device coupled to a USB Host. The method may be performed by the USB Host.

At step 702, the USB Host sends a request for a Device descriptor to the USB Device. At step 704, the USB Host receives a plurality of descriptors in a single transfer from the USB Device. At step 706, the USB Host sets a configuration of the USB Device based on the received plurality of descriptors.

The plurality of descriptors may include an entire set of descriptors the USB Device has to present to the USB Host. Moreover, when sending the request for the device descriptor to the USB Device, the USB Host may send a predetermined configuration or composition number to the USB Device. Accordingly, when receiving the plurality of descriptors, the USB Host may receive a minimum number of descriptors necessary to present to the USB Host based on the predetermined configuration or composition number.

Figure 8:
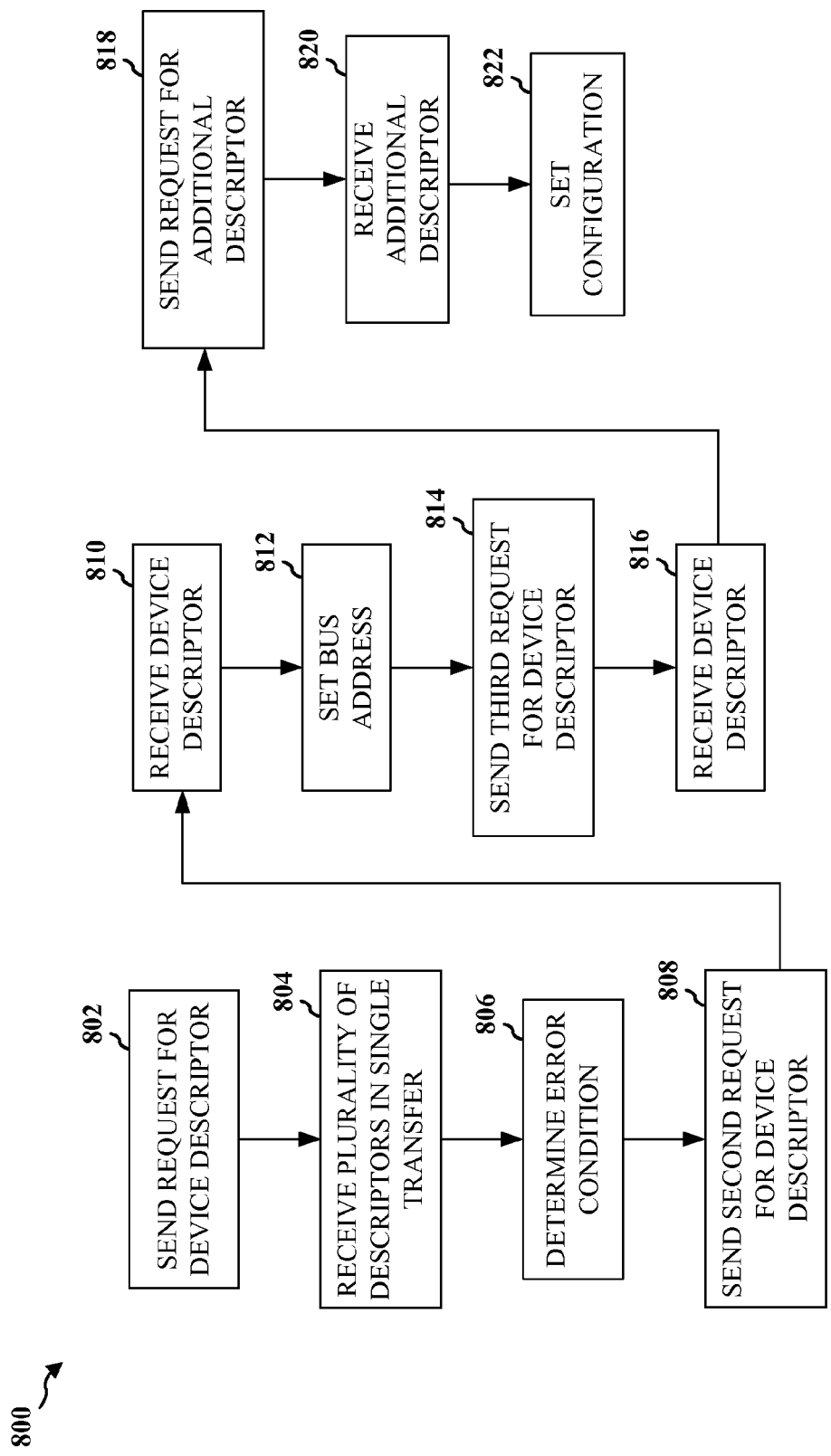
FIG. 8 is a flow chart of a method for shortening enumeration of a Universal Serial Bus (USB) Device coupled to a USB Host.

FIG. 8 is a flow chart 800 of a method for shortening enumeration of a Universal Serial Bus (USB) Device coupled to a USB Host. The method may be performed by the USB Host.

At step 802, the USB Host sends a request for a Device descriptor to the USB Device. At step 804, the USB Host receives a plurality of descriptors in a single transfer from the USB Device. At step 806, the USB Host determines that an error condition occurs.

After the error condition is determined by the USB Host, at step 808, the USB Host sends a second request for the Device descriptor to the USB Device based on the error condition. At step 810, the USB Host receives the Device descriptor from the USB Device in response to the second request.

Upon receiving the Device descriptor, at step 812, the USB Host sets a bus address for the USB Device. At step 814, the USB Host sends a third request for the Device descriptor to the USB Device. At step 816, the USB Host receives the Device descriptor from the USB Device in response to the third request.

At step 818, the USB Host sends at least one other request for at least one additional descriptor to the USB Device. The at least one additional descriptor may be different from the Device descriptor. At step 820, the USB Host receives the at least one additional descriptor from the USB Device in response to the at least one other request. In an aspect, the sending of the at least one other request for the at least one additional descriptor at step 818, and the receiving of the at least one additional descriptor at step 820, may be repeated according to a number of additional descriptors the USB Device has to present to the USB Host. Finally, at step 822, the USB Host sets a configuration of the USB Device based on all descriptors received from the USB Device.

Figure 9:
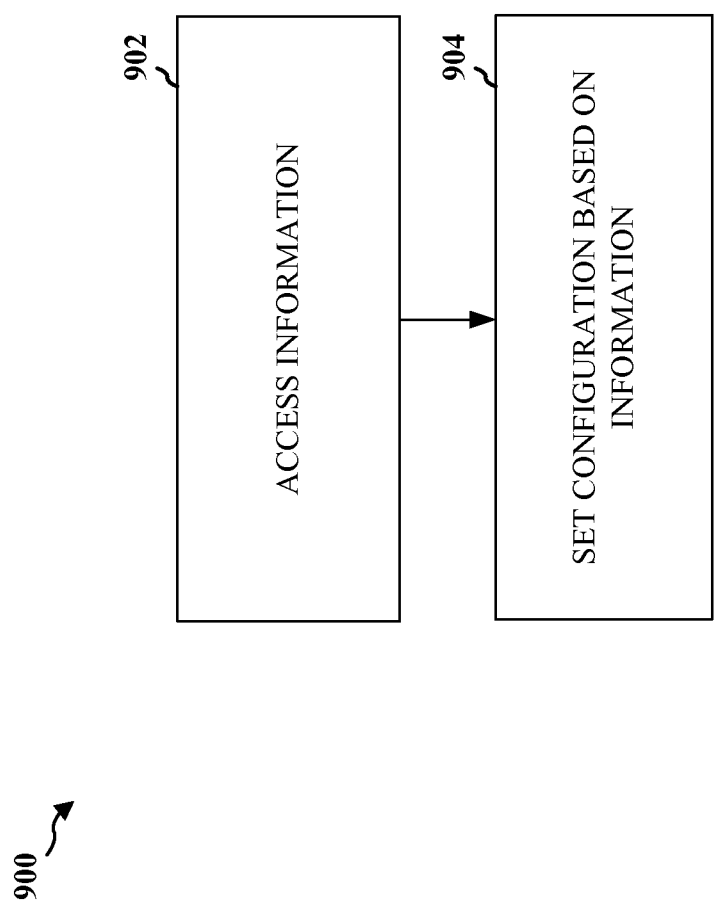
FIG. 9 is a flow chart of a method for shortening enumeration of a Universal Serial Bus (USB) Device coupled to a USB Host.

FIG. 9 is a flow chart 900 of a method for shortening enumeration of a Universal Serial Bus (USB) Device coupled to a USB Host. The method may be performed by the USB Host.

At step 902, the USB Host may access information previously known between the USB Host and the USB Device. Thereafter, at step 904, the USB Host may set a configuration of the USB Device based on the information previously known to the USB Host and the USB Device.

Figure 10:
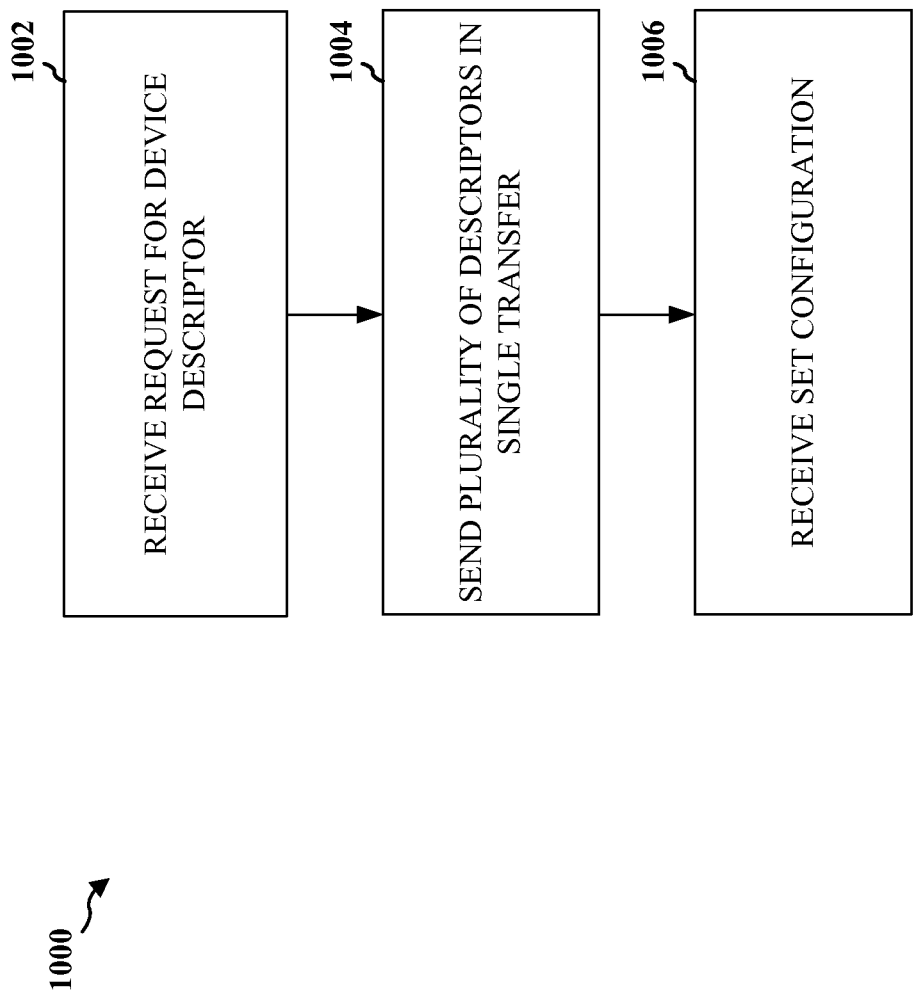
FIG. 10 is a flow chart of a method for shortening enumeration of a Universal Serial Bus (USB) Device coupled to a USB Host.

FIG. 10 is a flow chart 1000 of a method for shortening enumeration of a Universal Serial Bus (USB) Device coupled to a USB Host. The method may be performed by the USB Device.

At step 1002, the USB Device receives a request for a Device descriptor from the USB Host. At step 1004, the USB Device sends a plurality of descriptors in a single transfer to the USB Host. At step 1006, the USB Device receives a set configuration from the USB Host based on the plurality of descriptors sent to the USB Host.

In an aspect, the plurality of descriptors may include an entire set of descriptors the USB Device has to present to the USB Host. Moreover, when the USB Device receives the request for the Device descriptor from the USB Host, the USB Device may receive a predetermined configuration or composition number from the USB Host. Accordingly, when the USB Device sends the plurality of descriptors, the USB Device may send a minimum number of descriptors necessary to present to the USB Host based on the predetermined configuration or composition number.

Figure 11:
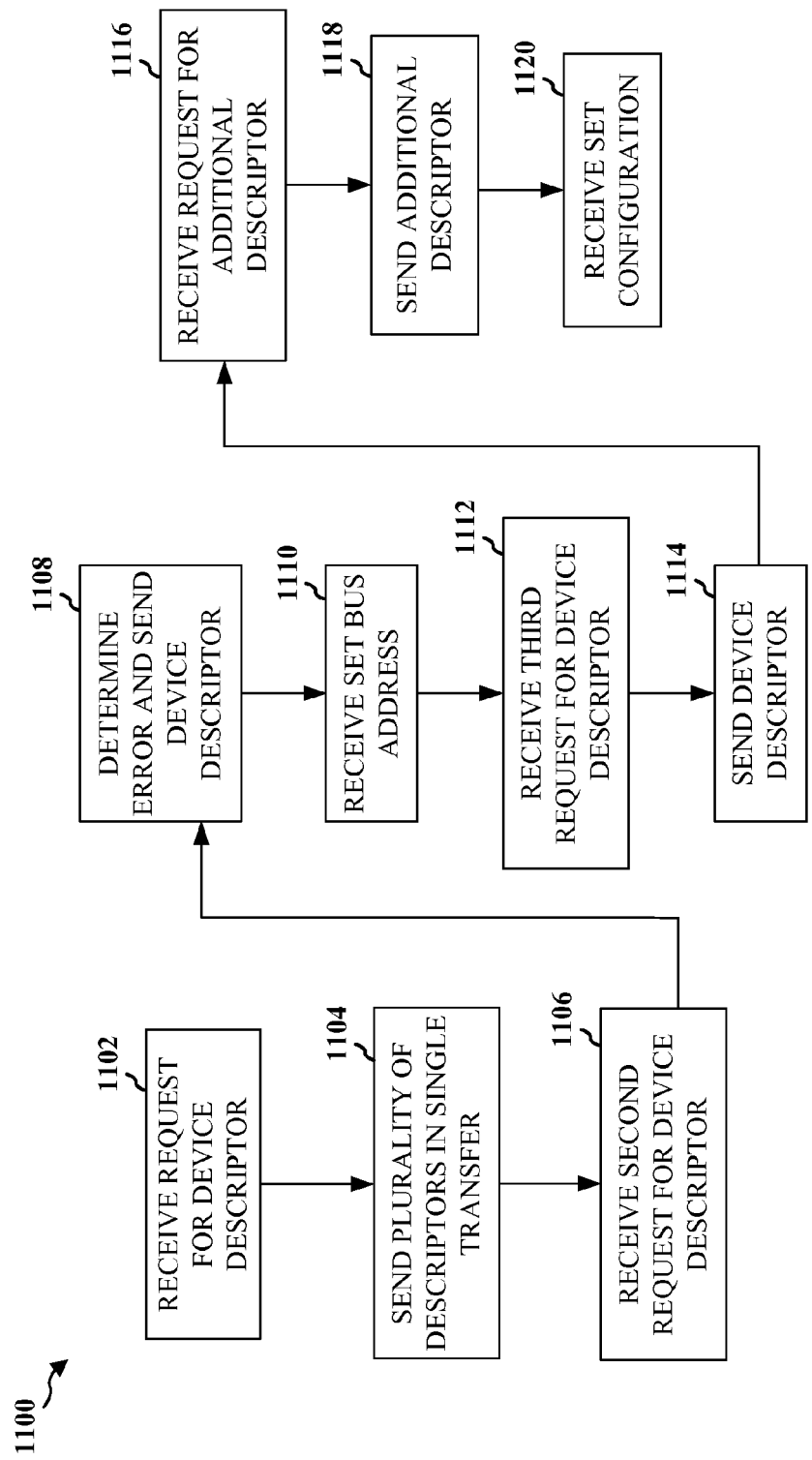
FIG. 11 is a flow chart of a method for shortening enumeration of a Universal Serial Bus (USB) Device coupled to a USB Host.

FIG. 11 is a flow chart 1100 of a method for shortening enumeration of a Universal Serial Bus (USB) Device coupled to a USB Host. The method may be performed by the USB Device.

At step 1102, the USB Device receives a request for a Device descriptor from the USB Host. At step 1104, the USB Device sends a plurality of descriptors in a single transfer to the USB Host. At step 1106, the USB Device receives a second request for the Device descriptor from the USB Host based on an error condition.

Upon receiving the second request for the Device descriptor, at step 1108, the USB Device determines that an error has occurred, and sends the Device descriptor alone to the USB Host in response to the second request. At step 1110, the USB Device receives a set bus address from the USB Host.

At step 1112, the USB Device receives a third request for the Device descriptor from the USB Host. At step 1114, the USB Device sends the Device descriptor to the USB Host in response to the third request.

At step 1116, the USB Device receives at least one other request for at least one additional descriptor from the USB Host. Here, the at least one additional descriptor may be different from the Device descriptor. At step 1118, the USB Device sends the at least one additional descriptor to the USB Host in response to the at least one other request. In an aspect, the receiving of the at least one other request for the at least one additional descriptor at step 1116, and the sending of the at least one additional descriptor at step 1118, may be repeated according to a number of additional descriptors the USB Device has to present to the USB Host. Finally, at step 1120, the USB Device receives a set configuration from the USB Host based on all descriptors sent to the USB Host.

Figure 12:
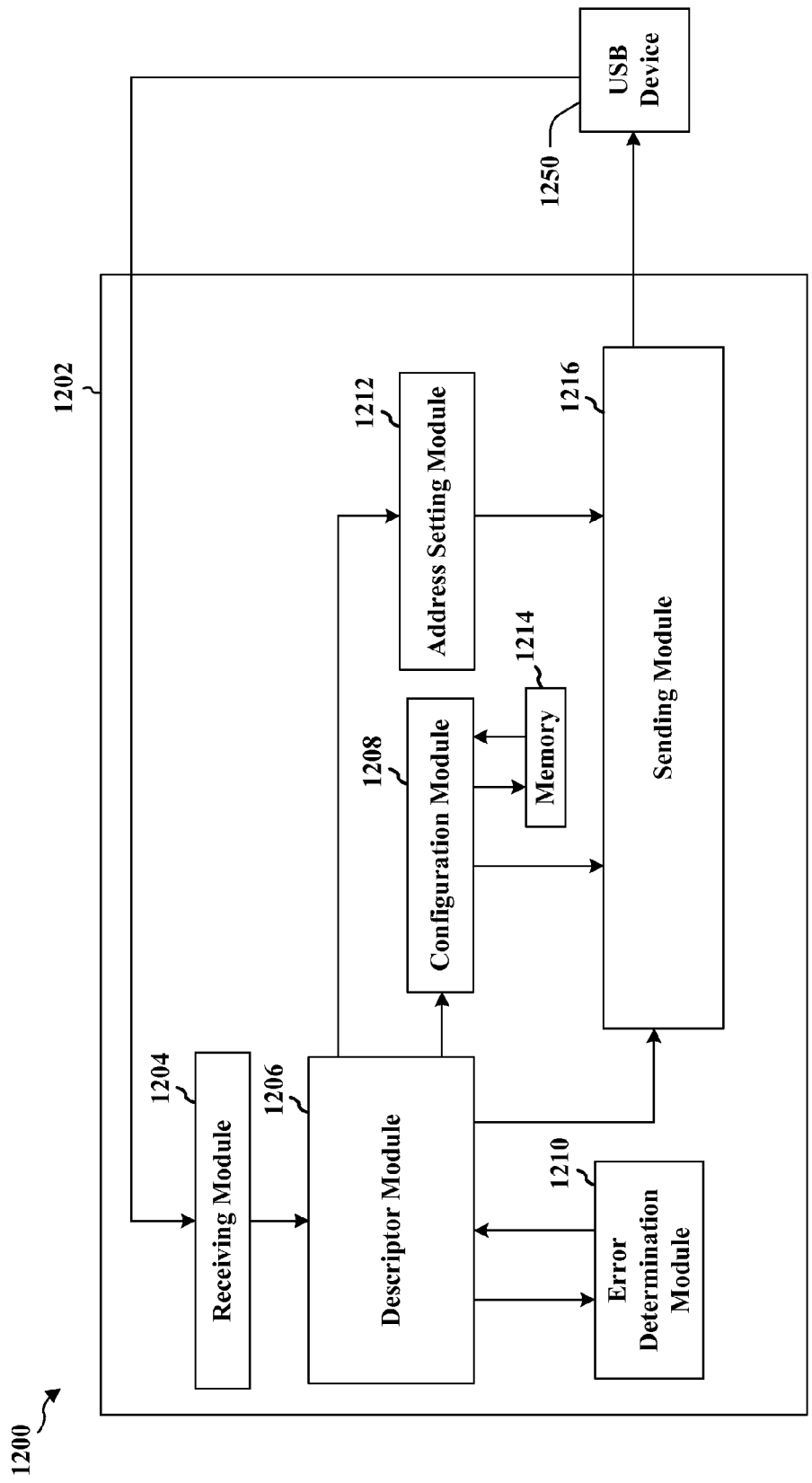
FIG. 12 is a conceptual data flow diagram illustrating the data flow between different modules/means/components in an exemplary USB Host.

FIG. 12 is a conceptual data flow diagram 1200 illustrating the data flow between different modules/means/components in an exemplary Universal Serial Bus (USB) Host 1202 for shortening enumeration of a Universal Serial Bus (USB) Device 1250 coupled to the USB Host 1202. The USB Host 1202 includes a receiving module 1204, a descriptor module 1206, a configuration module 1208, an error determination module 1210, an address setting module 1212, a memory 1214, and a sending module 1216.

In an aspect, the descriptor module 1206 may send a request for a Device descriptor to the USB Device 1250 via the sending module 1216. Thereafter, the descriptor module 1206 may receive a plurality of descriptors in a single transfer from the USB Device 1250 via the receiving module 1204. Based on the received plurality of descriptors, the configuration module 1208 may set a configuration of the USB Device 1250 via the sending module 1216.

The plurality of descriptors may include an entire set of descriptors the USB Device 1250 has to present to the USB Host 1202. Moreover, when sending the request for the device descriptor to the USB Device 1250, the descriptor module 1206 may send a predetermined configuration or composition number to the USB Device 1250. Accordingly, when receiving the plurality of descriptors, the descriptor module 1206 may receive a minimum number of descriptors necessary to present to the USB Host 1202 based on the predetermined configuration or composition number.

In a further aspect, the descriptor module 1206 may send a request for a Device descriptor to the USB Device 1250 via the sending module 1216. The descriptor module 1206 may then receive a plurality of descriptors in a single transfer from the USB Device 1250. Thereafter, the error determination module 1210 may determine that an error condition occurs.

After the error condition is determined by the error determination module 1210, the descriptor module 1206 may send a second request for the Device descriptor to the USB Device 1250 based on the error condition. The descriptor module 1206 may then receive the Device descriptor from the USB Device 1250 in response to the second request.

Upon receiving the Device descriptor at the descriptor module 1206, the address setting module 1212 may set a bus address for the USB Device 1250. The descriptor module may then send a third request for the Device descriptor to the USB Device 1250. Thereafter, the descriptor module 1206 may receive the Device descriptor from the USB Device 1250 in response to the third request.

The descriptor module 1206 may send at least one other request for at least one additional descriptor to the USB Device 1250. The at least one additional descriptor may be different from the Device descriptor. The descriptor module 1206 receives the at least one additional descriptor from the USB Device 1250 in response to the at least one other request. In an aspect, the sending of the at least one other request for the at least one additional descriptor, and the receiving of the at least one additional descriptor, may be repeated according to a number of additional descriptors the USB Device 1250 has to present to the USB Host 1202. The configuration module 1208 may set a configuration of the USB Device 1250 based on all descriptors received from the USB Device 1250.

In another aspect, the configuration module 1208 may access the memory 1214 for information previously known between the USB Host 1202 and the USB Device 1250. Thereafter, the configuration module 1208 may set a configuration of the USB Device 1250 based on the information previously known to the USB Host 1202 and the USB Device 1250.

Figure 13:
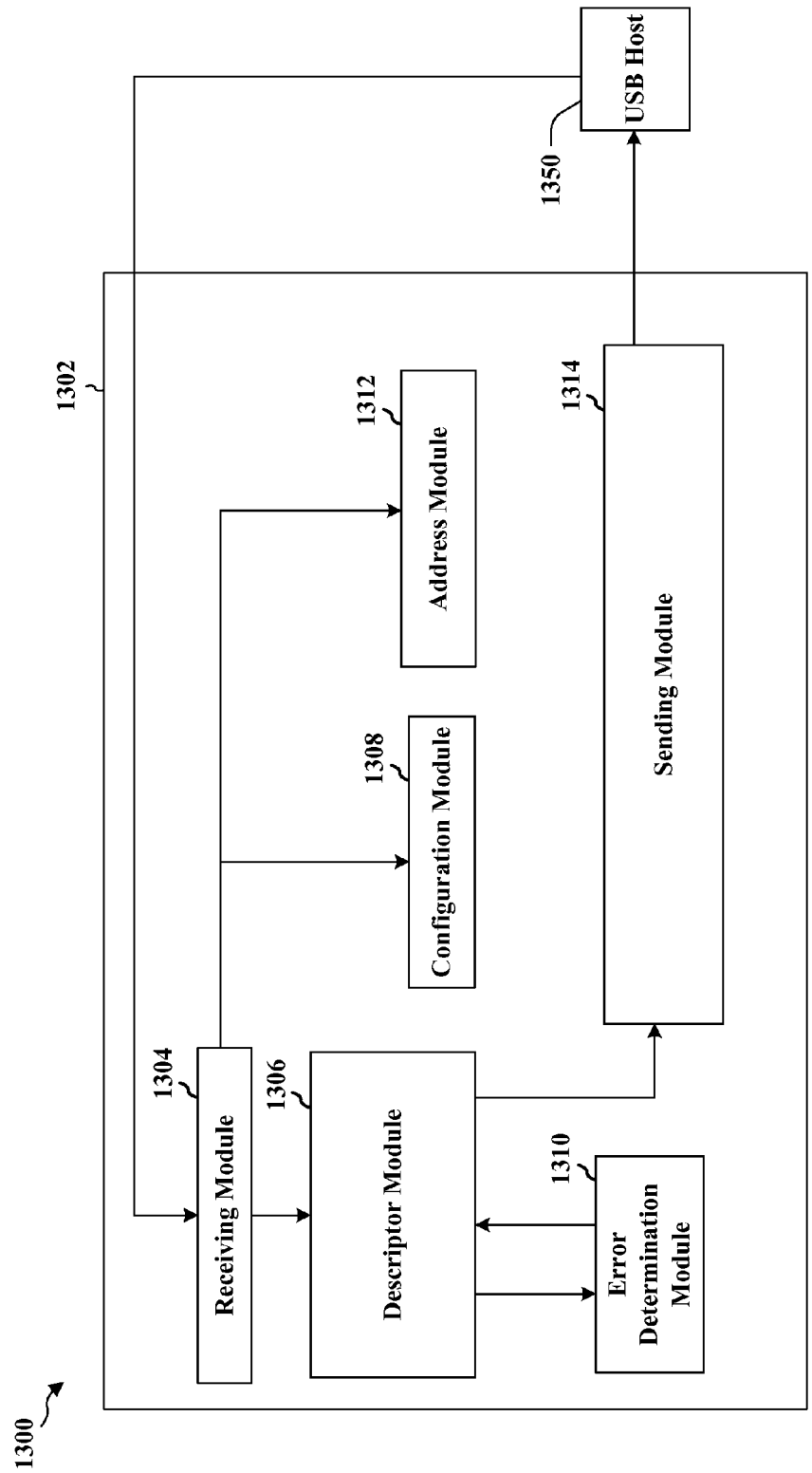
FIG. 13 is a conceptual data flow diagram illustrating the data flow between different modules/means/components in an exemplary USB Device.

FIG. 13 is a conceptual data flow diagram 1300 illustrating the data flow between different modules/means/components in an exemplary Universal Serial Bus (USB) Device 1302 for shortening enumeration of the USB Device 1302 coupled to a USB Host 1350. The USB Device 1302 includes a receiving module 1304, a descriptor module 1306, a configuration module 1308, an error determination module 1310, an address module 1312, and a sending module 1314.

In an aspect, the descriptor module 1306 may receive a request for a Device descriptor from the USB Host 1350 via the receiving module 1304. The descriptor module 1306 may then send a plurality of descriptors in a single transfer to the USB Host 1350 via the sending module 1314. Thereafter, the configuration module 1308 may receive, via the receiving module 1304, a set configuration from the USB Host 1350 based on the plurality of descriptors sent to the USB Host 1350.

The plurality of descriptors may include an entire set of descriptors the USB Device 1302 has to present to the USB Host 1350. Moreover, when the descriptor module 1306 receives the request for the Device descriptor from the USB Host 1350, the descriptor module 1306 may receive a predetermined configuration or composition number from the USB Host 1350. Accordingly, when the descriptor module 1306 sends the plurality of descriptors, the descriptor module 1306 may send a minimum number of descriptors necessary to present to the USB Host 1350 based on the predetermined configuration or composition number.

In a further aspect, the descriptor module 1306 may receive a request for a Device descriptor from the USB Host 1350 via the receiving module 1304. The descriptor module 1306 then sends a plurality of descriptors in a single transfer to the USB Host 1350. Thereafter, the descriptor module 1306 may receive a second request for the Device descriptor from the USB Host 1350 based on an error condition.

Upon receiving the second request for the Device descriptor at the descriptor module 1306, the error determination module 1310 determines that an error has occurred. Accordingly, the descriptor module 1306 may send the Device descriptor alone to the USB Host 1350 in response to the second request. The address module 1312 may then receive a set bus address from the USB Host 1350.

The descriptor module 1306 may receive a third request for the Device descriptor from the USB Host 1350. In response, the descriptor module 1306 may send the Device descriptor to the USB Host 1350.

The descriptor module 1306 may receive at least one other request for at least one additional descriptor from the USB Host 1350. Here, the at least one additional descriptor may be different from the Device descriptor. The descriptor module 1306 may then send the at least one additional descriptor to the USB Host 1350 in response to the at least one other request. In an aspect, the receiving of the at least one other request for the at least one additional descriptor, and the sending of the at least one additional descriptor, may be repeated according to a number of additional descriptors the USB Device 1302 has to present to the USB Host 1350. The configuration module 1308 may receive a set configuration from the USB Host 1350 based on all descriptors sent to the USB Host 1350.

The USB Host or USB Device may include additional modules that perform each of the steps of the algorithm in the aforementioned flow charts of FIGS. 7-11. As such, each step in the aforementioned flow charts of FIGS. 7-11 may be performed by a module and the USB Host or USB Device may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
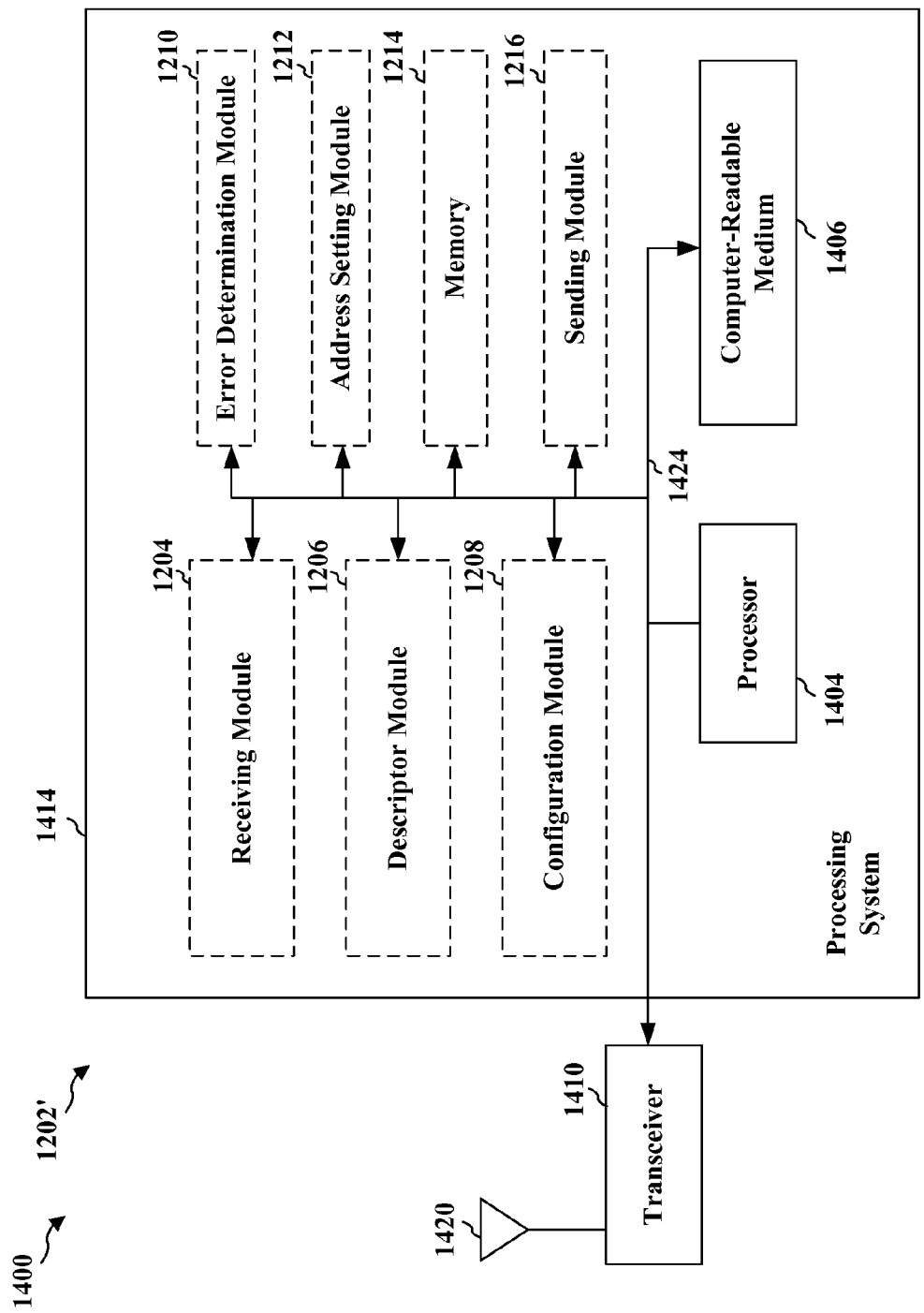
FIG. 14 is a diagram illustrating an example of a hardware implementation for a USB Host employing a processing system.

FIG. 14 is a diagram 1400 illustrating an example of a hardware implementation for a USB Host 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, 1212, 1214, 1216, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1204, 1206, 1208, 1210, 1212, 1214, and 1216. The modules may be software modules running in the processor 1404, resident/stored in the computer readable medium 1406, one or more hardware modules coupled to the processor 1404, or some combination thereof.

In one configuration, the USB Host 1202/1202' includes means for sending a request for a Device descriptor to the USB Device, means for receiving a plurality of descriptors in a single transfer from the USB Device, means for setting a configuration of the USB Device based on the received plurality of descriptors, means for determining that an error condition occurs, means for sending a second request for the Device descriptor to the USB Device based on the error condition, means for receiving the Device descriptor from the USB Device in response to the second request, means for setting a bus address for the USB Device, means for sending a third request for the Device descriptor to the USB Device, means for receiving the Device descriptor from the USB Device in response to the third request, means for sending at least one other request for at least one additional descriptor to the USB Device, the at least one additional descriptor different from the Device descriptor, means for receiving the at least one additional descriptor from the USB Device in response to the at least one other request, wherein the sending of the at least one other request for the at least one additional descriptor and the receiving of the at least one additional descriptor are repeated according to a number of additional descriptors the USB Device has to present to the USB Host, means for setting a configuration of the USB Device based on all descriptors received from the USB Device, and means for setting a configuration of the USB Device based on information previously known to the USB Host and the USB Device. The aforementioned means may be one or more of the aforementioned modules of the USB Host 1202 and/or the processing system 1414 of the USB Host 1202' configured to perform the functions recited by the aforementioned means.

Figure 15:
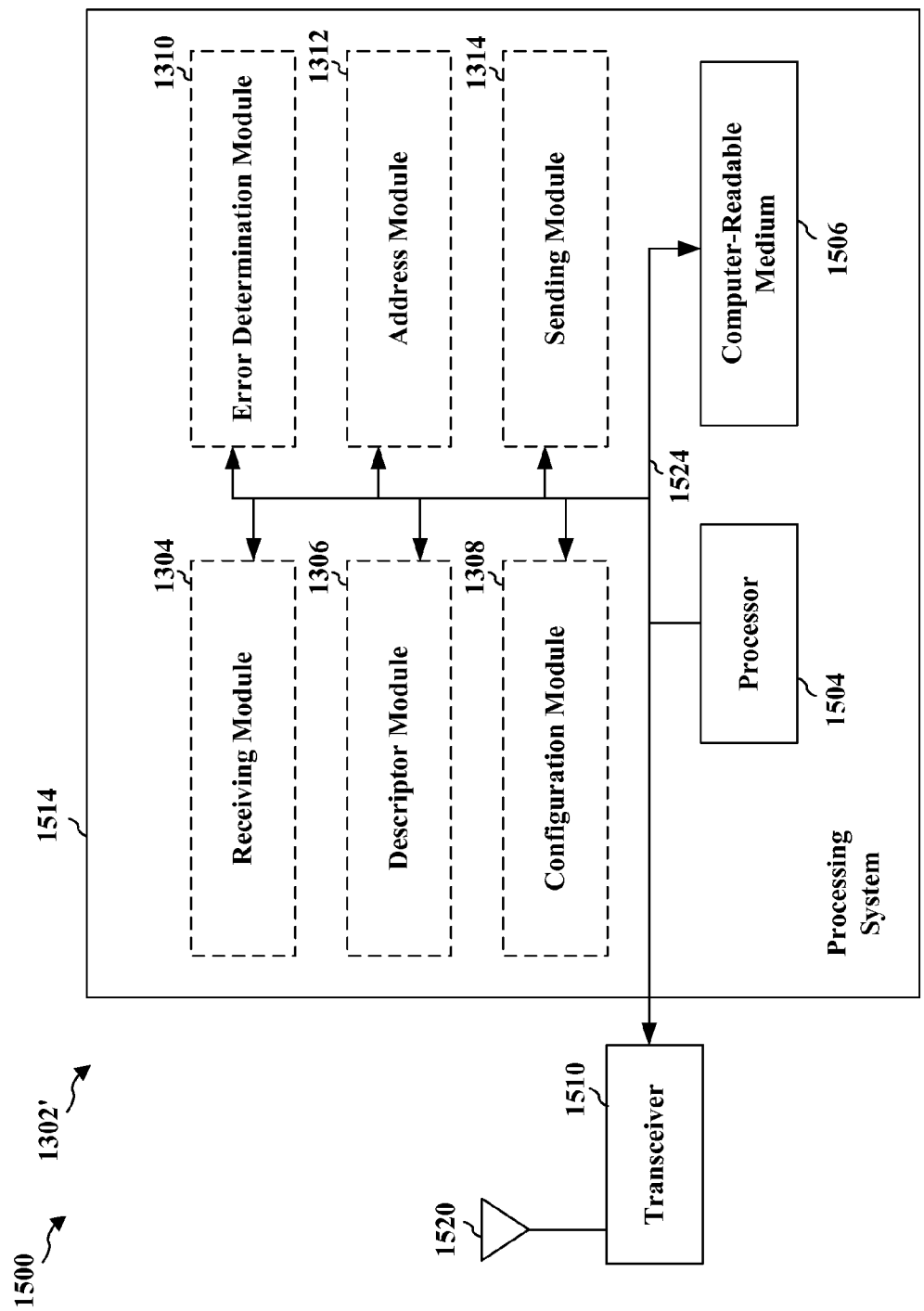
FIG. 15 is a diagram illustrating an example of a hardware implementation for a USB Device employing a processing system.

FIG. 15 is a diagram 1500 illustrating an example of a hardware implementation for a USB Device 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, 1312, 1314, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1304, 1306, 1308, 1310, 1312, and 1314. The modules may be software modules running in the processor 1504, resident/stored in the computer readable medium 1506, one or more hardware modules coupled to the processor 1504, or some combination thereof.

In one configuration, the USB Device 1302/1302' includes means for receiving a request for a Device descriptor from the USB Host, means for sending a plurality of descriptors in a single transfer to the USB Host, means for receiving a set configuration from the USB Host based on the plurality of descriptors sent to the USB Host, means for receiving a second request for the Device descriptor from the USB Host based on an error condition, means for sending the Device descriptor to the USB Host in response to the second request, means for receiving a set bus address from the USB Host, means for receiving a third request for the Device descriptor from the USB Host, means for sending the Device descriptor to the USB Host in response to the third request, means for receiving at least one other request for at least one additional descriptor from the USB Host, the at least one additional descriptor different from the Device descriptor, means for sending the at least one additional descriptor to the USB Host in response to the at least one other request, wherein the receiving of the at least one other request for the at least one additional descriptor and the sending of the at least one additional descriptor are repeated according to a number of additional descriptors the USB Device has to present to the USB Host, and means for receiving a set configuration from the USB Host based on all descriptors sent to the USB Host. The aforementioned means may be one or more of the aforementioned modules of the USB Device 1302 and/or the processing system 1514 of the USB Device 1302' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for shortening enumeration of a Universal Serial Bus (USB) Device coupled to a USB Host, comprising:
   sending a request for a Device descriptor to the USB Device;
   receiving, in response to the request for the Device descriptor, a plurality of descriptors in a single transfer from the USB Device; and
   setting a configuration of the USB Device based on the received plurality of descriptors.

2. The method of claim 1, wherein the plurality of descriptors comprises an entire set of descriptors the USB Device has to present to the USB Host.

3. The method of claim 1, wherein:
   the sending the request for the device descriptor to the USB Device comprises sending a predetermined configuration or composition number to the USB Device; and
   the receiving the plurality of descriptors comprises receiving a minimum number of descriptors necessary to present to the USB Host based on the predetermined configuration or composition number.

4. A method for shortening enumeration of a Universal Serial Bus (USB) Device coupled to a USB Host, comprising:
   receiving a request for a Device descriptor from the USB Host;
   sending, in response to the request for the Device descriptor, a plurality of descriptors in a single transfer to the USB Host; and
   receiving a set configuration from the USB Host based on the plurality of descriptors sent to the USB Host.

5. The method of claim 4, wherein the plurality of descriptors comprises an entire set of descriptors the USB Device has to present to the USB Host.

6. The method of claim 4, wherein:
   the receiving the request for the Device descriptor from the USB Host comprises receiving a predetermined configuration or composition number from the USB Host; and
   the sending the plurality of descriptors comprises sending a minimum number of descriptors necessary to present to the USB Host based on the predetermined configuration or composition number.

7. A Universal Serial Bus (USB) Host for shortening enumeration of a USB Device coupled to the USB Host, comprising:

means for sending a request for a Device descriptor to the USB Device;

means for receiving, in response to the request for the Device descriptor, a plurality of descriptors in a single transfer from the USB Device; and means for setting a configuration of the USB Device based on the received plurality of descriptors.

8. The USB Host of claim 7, wherein the plurality of descriptors comprises an entire set of descriptors the USB Device has to present to the USB Host.

9. The USB Host of claim 7, wherein:

the means for sending the request for the device descriptor to the USB Device is configured to send a predetermined configuration or composition number to the USB Device; and the means for receiving the plurality of descriptors is configured to receive a minimum number of descriptors necessary to present to the USB Host based on the predetermined configuration or composition number.

10. A Universal Serial Bus (USB) Device coupled to a USB Host for shortening enumeration, the USB Device comprising:

means for receiving a request for a Device descriptor from the USB Host;

means for sending, in response to the request for the Device descriptor, a plurality of descriptors in a single transfer to the USB Host; and means for receiving a set configuration from the USB Host based on the plurality of descriptors sent to the USB Host.

11. The USB Device of claim 10, wherein the plurality of descriptors comprises an entire set of descriptors the USB Device has to present to the USB Host.

12. The USB Device of claim 10, wherein:

the means for receiving the request for the Device descriptor from the USB Host is configured to receive a predetermined configuration or composition number from the USB Host; and the means for sending the plurality of descriptors is configured to send a minimum number of descriptors necessary to present to the USB Host based on the predetermined configuration or composition number.

13. A Universal Serial Bus (USB) Host for shortening enumeration of a USB Device coupled to the USB Host, comprising:

a processing system configured to:

send a request for a Device descriptor to the USB Device;

receive, in response to the request for the Device descriptor, a plurality of descriptors in a single transfer from the USB Device; and set a configuration of the USB Device based on the received plurality of descriptors.

14. The USB Host of claim 13, wherein the plurality of descriptors comprises an entire set of descriptors the USB Device has to present to the USB Host.

15. The USB Host of claim 13, wherein:

the processing system configured to send the request for the device descriptor to the USB Device is further configured to send a predetermined configuration or composition number to the USB Device; and the processing system configured to receive the plurality of descriptors is further configured to receive a minimum number of descriptors necessary to present to the USB Host based on the predetermined configuration or composition number.

16. A Universal Serial Bus (USB) Device coupled to a USB Host for shortening enumeration, the USB Device comprising:

a processing system configured to:

receive a request for a Device descriptor from the USB Host;

send, in response to the request for the Device descriptor, a plurality of descriptors in a single transfer to the USB Host; and receive a set configuration from the USB Host based on the plurality of descriptors sent to the USB Host.

17. The USB Device of claim 16, wherein the plurality of descriptors comprises an entire set of descriptors the USB Device has to present to the USB Host.

18. The USB Device of claim 16, wherein:

the processing system configured to receive the request for the Device descriptor from the USB Host is further configured to receive a predetermined configuration or composition number from the USB Host; and the processing system configured to send the plurality of descriptors is further configured to send a minimum number of descriptors necessary to present to the USB Host based on the predetermined configuration or composition number.

19. A computer program product for shortening enumeration of a Universal Serial Bus (USB) Device coupled to a USB Host, comprising:

a non-transitory computer-readable medium comprising code for:

sending a request for a Device descriptor to the USB Device;

receiving, in response to the request for the Device descriptor, a plurality of descriptors in a single transfer from the USB Device; and setting a configuration of the USB Device based on the received plurality of descriptors.

20. A computer program product for shortening enumeration of a Universal Serial Bus (USB) Device coupled to a USB Host, comprising:

a non-transitory computer-readable medium comprising code for:

receiving a request for a Device descriptor from the USB Host;

sending, in response to the request for the Device descriptor, a plurality of descriptors in a single transfer to the USB Host; and receive a set configuration from the USB Host based on the plurality of descriptors sent to the USB Host.

\* \* \* \* \*